Figure 1:
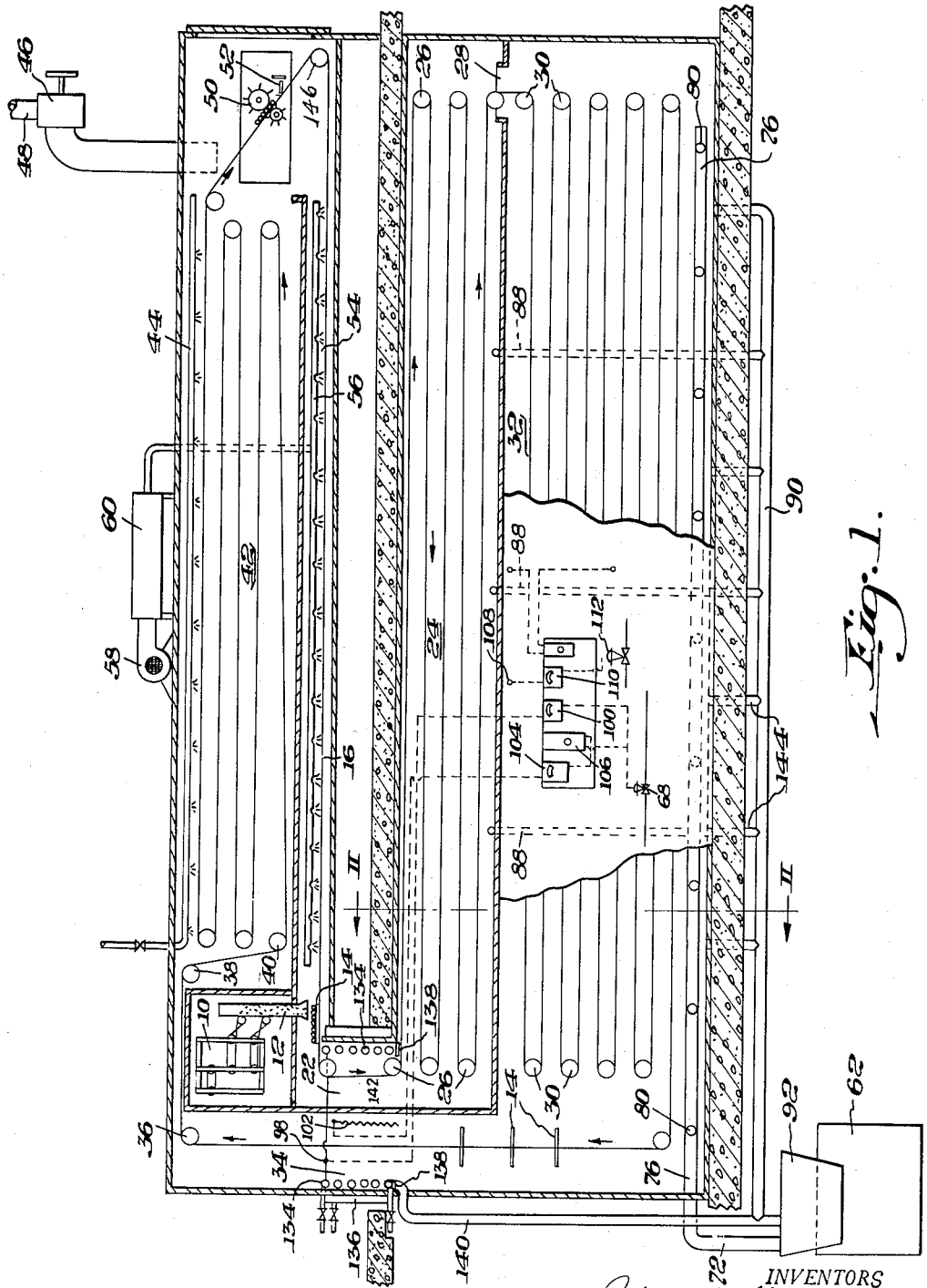

Feb. 7, 1956　　　R. H. STIMPSON ET AL　　　2,733,651
STERILIZATION OF CANNED FOODS
Original Filed June 27, 1951　　　2 Sheets-Sheet 1

INVENTORS
Robert H. Stimpson
BY James B. Anderson
Christy, Parmelee and Strickland.
ATTORNEYS.

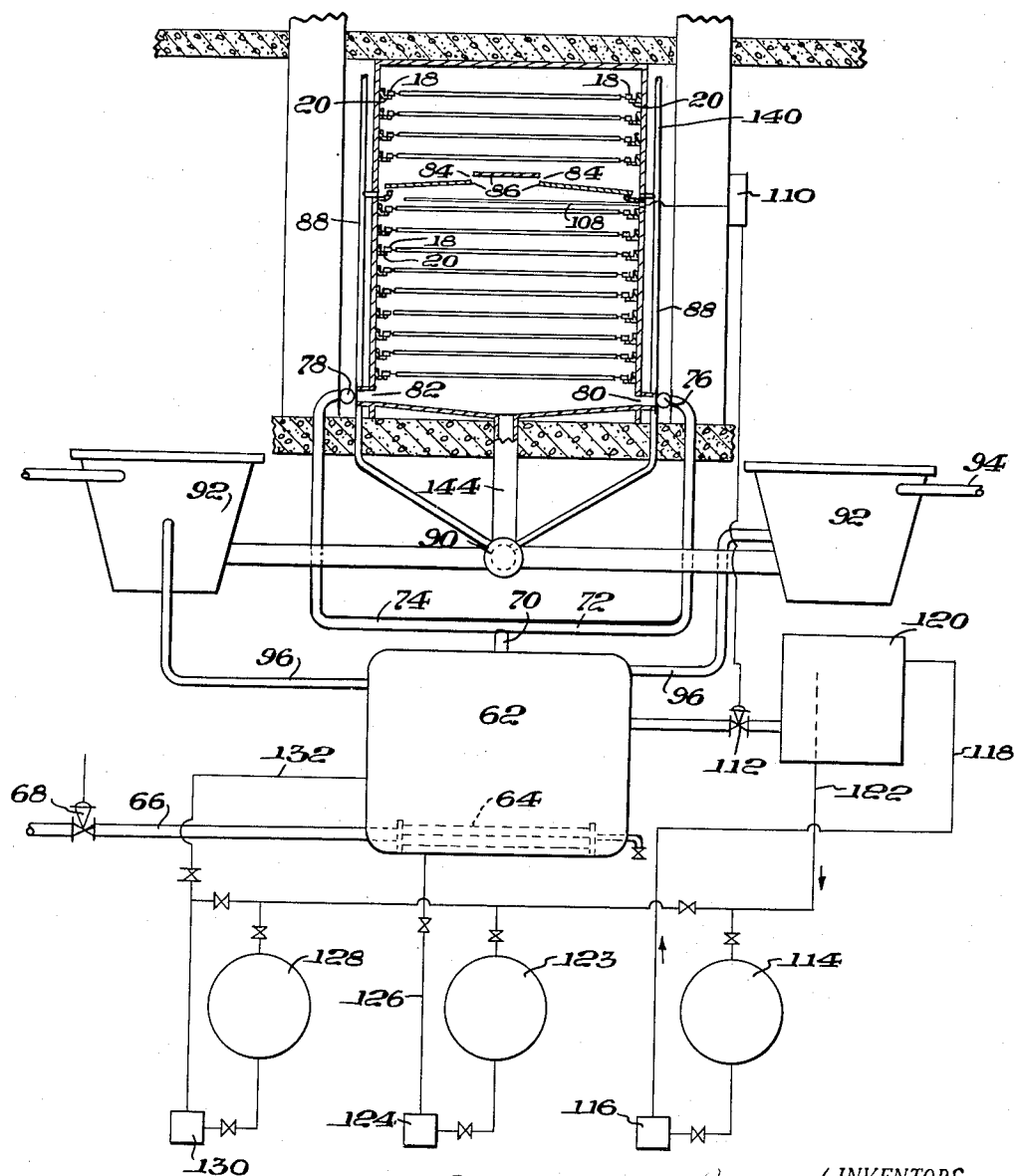

United States Patent Office 2,733,651
Patented Feb. 7, 1956

2,733,651
STERILIZATION OF CANNED FOODS

Robert H. Stimpson, Pittsburgh, and James B. Anderson, Mount Lebanon Township, Allegheny County, Pa., assignors to H. J. Heinz Company, Pittsburgh, Pa., a corporation of Pennsylvania Original application June 27, 1951, Serial No. 233,766. Divided and this application August 30, 1952, Serial No. 307,352

7 Claims. (Cl. 99—362)

This invention relates to the sterilization of canned foods. More particularly, the invention relates to a continuously operating apparatus for vapor heat sterilization of canned food at atmospheric pressure while heating successively in a variable temperature zone and a controlled temperature zone.

Commonly, sterilized canned foods, such as beans, pork and beans, corn, and many different kinds of soups, present difficult problems for heating in order to have the foods properly sterilized. These foods are sealed in cans and are often of a thick, viscous consistency. Such products have a low thermal conductivity and are easily destroyed by over-heating. The lethality rate for sterilization of all foods varies quite widely and depends upon factors such as the acidity of the product. Each food has a lethality rate number which is the equivalent number of minutes at which the food must be heated at 250° F. in order to destroy or to render harmless the bacteria in the food.

We have found that the vapors of chlorinated hydrocarbons such as perchloroethylene and trichloroethylene, which have been stabilized to prevent them from reacting chemically with other materials when heated to their boiling temperatures, are satisfactory for heating foods while in the vaporous condition. The vapors of these hydrocarbons have a specific gravity of three to six times the specific gravity of air, so that these vapors may be used in a heating chamber that is open to the atmosphere by cooling the upper portion of the heating chamber to condense the vapors passing into the open portion.

In a continuous sterilizing method, the canned food is carried through the sterilizing zones on a conveyor so that the limitations of the size of the sterilizing chamber and the length and rate of movement of the conveyor through the zones depend upon the time required for heating at the existing temperatures in the two heating zones to accumulate the required lethality.

We have found, for example, that a wide range of vapor heating temperatures may be developed by using a mixture of trichloroethylene and perchloroethylene. Trichloroethylene has a boiling point of approximately 189° F., while perchloroethylene has a boiling point of approximately 250° F., and by using a mixture of four parts of perchloroethylene and one part trichloroethylene, a vapor temperature of approximately 230° F. may be developed when the mixture is vaporized.

| F. Boiling Temperature of Liquid | Percent By Weight Trichloroethylene | Percent By Weight Perchloroethylene |
|---|---|---|
| 188.4 | 100 | 0 |
| 190.4 | 90 | 10 |
| 194.0 | 80 | 20 |
| 197.6 | 70 | 30 |
| 203.0 | 60 | 40 |
| 208.4 | 50 | 50 |
| 213.8 | 40 | 60 |
| 221.0 | 30 | 70 |
| 228.2 | 20 | 80 |
| 237.3 | 10 | 90 |
| 250.2 | 0 | 100 |

When a vapor mixture of trichloroethylene and perchloroethylene passes up through a heating chamber into contact with cold cans, the trichloroethylene becomes more concentrated because a condensation takes place with accompanying fractionation and the temperature of the vapor mixture decreases as the vapor rises in the heating chamber. This vapor temperature decrease in a sterilization chamber is serious if it takes place during the final sterilization period. It is preferred to use a sterilizing medium equivalent to the final sterilization temperature of the product to eliminate the possibility of excess temperatures in the product. If this final temperature decreases, the corresponding temperature of the product also decreases. As lethality depends on time and temperature, a decrease in temperature requires an increase in time and can be compensated for if known, but a variable decrease in temperature such as is experienced when fractionation takes place cannot be compensated for. The present invention separates the sterilizing chamber into two sections, the first of which will have a temperature decrease caused by fractionation, but because this zone is the one into which the cans are brought initially and because a large temperature differential exists between the sterilizing medium and the product in the cans, the effect on time is insignificant. In the final sterilizing zone where temperature becomes critical, the fractionation is at a minimum because of the small heat load due to the low temperature differential and therefore the sterilizing medium remains relatively constant.

The primary object of the present invention is to provide an apparatus for sterilizing food continuously with vapor heating at atmospheric pressure when using different vapor temperatures for the initial heating and for the final sterilization of the canned food.

Another object of the invention is to provide an apparatus for continuously heating canned foods in a variable temperature vapor fractionating zone while promoting a rapid condensation of the vapors, and a final sterilization zone where the vapor temperature is substantially uniform.

A further object of the invention is to provide an apparatus for heating canned food continuously in a vapor heating zone wherein an initial sterilization is obtained by preheating the incoming relatively cold canned food with vapors leaving a final uniform temperature sterilizing zone and separately recovering the vapor condensate from the two zones.

A still further object of the invention is to provide an apparatus for sterilizing canned food continuously in a uniform temperature vapor heating zone while initially heating the incoming relatively cold canned food to a temperature that will not reduce the temperature of the vapor at the top of the sterilizing zone more than about 1° F. in temperature below the temperature at the bottom of the sterilizing zone.

Another object of the invention is to provide an apparatus for continuously sterilizing canned food with vapor heating in a uniform temperature final sterilizing zone and in an initial vapor fractionation heating zone with a mixture of chlorinated hydrocarbon vapors generated in a separate vaporizer wherein the vapor condensate from the heating zones is returned to the generator where a uniform composition of hydrocarbon mixture is maintained in accordance with the temperature being maintained in the sterilizing zone.

With these and other objects in view, the invention consists in the continuous sterilization of canned foods as hereinafter described and particularly defined in the claims.

The various features of the invention are illustrated in the accompanying drawings, in which:

Fig. 1 is a view in side elevation, with parts shown in section, of the preferred form of an apparatus in which the method of the present invention may be carried out; and Fig. 2 is a vertical sectional view of the sterilizing and preheating chambers of the apparatus taken on the line II—II of Fig. 1, and showing the vapor generating apparatus used therewith.

To carry out the method with the apparatus shown in the drawings, canned food is distributed by a multiple distributor 10 into a loading station 12 upon a tray 14. The tray is made up of a series of rods which extend across the width of the vaporizing chamber, and preferably are arranged to hold eight rows of cans with twelve cans in a row, the number of cans in the row varying in accordance with the size of the can. The trays 14 are mounted in a conveyor 16 which is made up of chains which run along the side of the heating chamber and are connected to the central portion of each end of the tray. As shown in Fig. 2, guide rolls 18 are mounted at each corner of the tray, which cooperate with tracks 20 to maintain the trays in a horizontal position as they are moved back and forth through the heating chamber. The loaded tray first passes downwardly through an incoming throat 22 into a variable temperature preheating chamber 24. The conveyor passes around guide pulleys 26 and traverses five times through the preheating chamber for heating the cans of food from a temperature of about 160° F. to a temperature of 220° F. to 226° F., when a temperature of 230° F. is used for the sterilization in the sterilizing zone.

The conveyor leaving the preheating chamber passes down through an opening 28 around guide pulleys 30 into a final controlled temperature sterilizing chamber or zone 32. The conveyor makes nine complete passes throughout the length of the final zone in completing the sterilization of the food from the income temperature to a temperature of approximately 230° F., which is the temperature of the central inner portion of the food in the cans. After passing through the last flight of the conveyor in the heating chamber, the food moves upwardly through an outlet throat 34. The vapor from the sterilizing chamber extends into the outlet throats 22 and 34 and a predetermined vapor level is maintained in the throats. After leaving the throat 34, the conveyor, with the cans thereon, passes over a pulley 36 and down around pulleys 38 and 40 into a cooling zone 42. The conveyor makes five complete passes throughout the length of the cooling zone, and while passing through the cooling zone, the cans are cooled by means of water which is sprayed onto the top row of cans by spray pipes 44. At the same time, air is drawn in through the sides of the cooling zone and exhausted by means of a fan 46 through an outlet 48. After passing through the cooling zone, the conveyor passes in a downwardly inclined path through an unloading station 50, where the cans are removed from the trays and deposited on a conveyor 52 to be removed from the sterilizing apparatus. The trays and conveyor, after passing through the cooling zone, generally have moisture thereon, and this conveyor, with the trays thereon, then passes through a drying zone 54 where they are treated with hot air introduced through a pipe 56, by means of a blower 58, which circulates the air through a heater 60. The dried, preheated trays and conveyor then advance to the loading station 12 for more cans to return in a cyclic path.

The mixtures of trichloroethylene and perchloroethylene are held in a vaporizer 62 and vaporized by means of a steam coil 64 in the bottom of the vaporizer, the steam being in a closed coil and introduced through a pipe 66. The steam is preferably held under pressure and introduced by a control valve 68. In accordance with the desired temperature, a mixture of definite percentages of trichloroethylene and perchloroethylene is vaporized in the vaporizer, and the vapor mixture passes up through a pipe 70 to branch pipes 72 and 74 which connect with distributing pipes 76 and 78 that extend along substantially the entire length of the sterilization chamber. Inlets 80 and 82 at opposite sides of the chamber permit vapors to be introduced throughout substantially the entire length of the sterilization chamber 32. The vapors rise through the chamber and the vapor input is controlled to maintain a substantially uniform level in the throats 22 and 34. After passing through the sterilizing zone of chamber 32, the vapors flow through openings 84 (Fig. 2) formed in the central portion of a three-part baffle 86. From the baffle 86 the vapors pass upwardly through the initial heating zone of chamber 24 and contact with the food cans on the trays in the preheating zone. Vapor which passes through the baffle 86 is condensed very rapidly by contacting the colder cans so that active condensation takes place throughout the heating zone of chamber 24. In fact, the major portion of the condensation in the chamber 24 takes place during the first two passes of the conveyor through the chamber. Thereafter the condensation decreases rapidly. The condensate formed in the chamber 24 is collected at the sides of the baffle 86 and is conducted through pipes 88 to a header 90 (Fig. 1) which leads the condensate to a water separator 92 positioned at each side of the vaporizing chamber. The water rises and overflows from the top of the separator 92 through an outlet 94 and condensate flows through lines 96 back to the vaporizer 62. Practically all of the water condensed in the apparatus is removed at the base of the throat 22 and upon the baffle 86 at the bottom of the preheating chamber.

Condensing is also used in controlling the vapor level in the throats 22 and 34. For this purpose a coil 134 is positioned around the inner periphery of the throats and a cooling jacket 136 surrounds the outside of the throats. Cooling water is introduced through the bottom of the coils 134 and jacket 136 and is removed from the upper portion of the coil and jacket to condense vapor and assist the controller 106 in maintaining the desired vapor level. Condensate from coils 134 and jacket 136 runs down the inside wall of the throat and is caught in a trough 138 at the bottom of the throat. From the trough 138 the condensate is led through a pipe 140 to the water separator 92. The vapor temperature in the inlet throat 22 is lower than in the throat 34, these throats being separated from one another by a baffle 142. The baffle is effective in preventing moisture from getting into the sterilizing chamber and most of the moisture is condensed in the throat 22 to be removed from the vapors.

In carrying out the preferred process with the present apparatus, most of the heat input required for sterilizing the food is accomplished in the preheating zone of chamber 24 wherein the condensate is rapidly produced. The remaining heat is introduced into the canned food in the final sterilizing zone of chamber 32. The condensate produced in the chamber 32 is removed from the bottom of the chamber by outlet pipes 144 which conduct the condensate to a water separator 92. A series of outlet pipes 144 for condensate are distributed along the base of the chamber 32. By separately removing the condensate from the preheating chamber and from the final sterilizing chamber, the temperature of the vapors in the two chambers may be accurately controlled, and at the same time the two condensates may be joined in the vaporizer to maintain a substantially uniform composition of chlorinated hydrocarbons therein.

The condensation of vapors in the sterilizing and preheating chambers 32 and 24 respectively creates a vapor circulation through the chambers, the velocity of which materially assists in maintaining a uniform temperature in the final sterilizing zone and controls the rate of falling temperature as the vapor rises in the initial heating zone. The vapor velocity through the final sterilizing zone will be approximately uniform and have a rate which will maintain a temperature drop of about 1° F.

in passing from the bottom to the top of the final sterilizing zone, because the vapor condensation in this zone is small. In order to maintain this substantially uniform temperature in the final sterilizing zone, we have found that when using a temperature of 230° F. for sterilizing, that we must introduce into the heating chamber about 100% more vapor by volume than is required to heat the cans and their contents of 230° F. and to supply the heat for radiation losses and for heating the conveyor and trays.

The conveyor is preferably operated at such a rate that the preheated canned foods will be brought to a temperature within 10° to 3° F. of the temperature in the sterilizing zone before the canned foods enter this zone. As the temperature of the food in the cans approaches the final temperature, the rate of heat transfer is very slow, so that more time is required to bring the food to the final sterilizing temperature.

With the high specific gravity of the chlorinated hydrocarbons, an air vapor interface will exist in the throats 22 and 34. The vapor level in these throats is maintained by means of a gas filled coil 102, positioned in the outlet throat 34. A predetermined level is maintained by the coil 102, and as the level tends to lower or rise, the level position is transmitted to an instrument 104, through a gas filled control system which communicates with a control instrument 106 to actuate the steam valve 68 (Figs. 1 and 2), to increase or decrease the steam pressure for controlling the vapor level in the throats 22 and 34. By this means, a predetermined level is maintained in the throat.

A maximum vapor level control bulb 98 is positioned in the outlet throat 34 which is connected by a vapor filled thermal system to a control instrument 100 also connected with the steam valve 68 (Figs. 1 and 2). As the vapor level tends to rise above the bulb 98, instrument 100 will close the steam valve to stop vapor generation which will lower the vapor level. The bulb 98 and controller 100 comprise a safety device for preventing the loss of heating vapors.

A control of the temperature in the sterilizing zone is maintained by means of a mercury-filled thermometer 108, which is positioned in the sterilizing zone adjacent the top thereof. The temperature of the thermometer is imparted to an instrument 110 by a mercury-filled thermal system which in turn controls the operation of a valve 112 for introducing trichloroethylene to the vaporizer 64. The trichloroethylene in bulk is located in tank 114 and is continually circulated by means of a pump 116 through a line 118 to an overflow tank 120. Excess trichloroethylene which enters the tank 120 overflows through a line 122 back to the tank 114. In accordance with the operation of the valve 112 (Fig. 2) the supply of trichloroethylene from the tank 120 to the tank 62 is controlled. By this means, a uniform mixture of trichloroethylene and perchloroethylene is maintained in order to obtain the desired vapor temperature in the sterilizing zone.

To assist in maintaining the desired temperature in the preheating and sterilizing chambers, and to minimize heat loss, these chambers are fully insulated against heat losses.

Perchloroethylene is maintained in bulk in a tank 123 and may be introduced into the vaporizer 64 by means of a pump 124 and lines 126 as desired. A third storage tank 128 is maintained for a mixture of trichloroethylene and perchloroethylene since the mixture in the vaporizer 62 is distilled from time to time to remove lubricants therefrom which accumulate from the lubrication of the rollers and chain of the conveyor. This accumulated mixture may be circulated by a pump 130 through a line 132 to the vaporizer 62. With the thermometer 108 and the control valve 112, any desired mixture of trichloroethylene and perchloroethylene may be maintained in the vaporizer 62 to obtain the desired vapor temperature in the sterilizing chamber. It will be understood that the lowest temperature of 189° F. would be maintained by the use of trichloroethylene alone, while a temperature of 250° F. would be maintained by the use of perchloroethylene alone. Any temperatures between 189° F. and 250° F. would be maintained by mixtures of these two components.

The viscosity of the mixtures of trichloroethylene and perchloroethylene are comparatively low, varying from 0.55 to 0.99 centipoise at 20° C. The low viscosity condensates rapidly run off the food cans and assist in a good heat transfer.

By maintaining accurate control of time by the rate of movement of the conveyor through a variable speed motor drive (not shown) connected with conveyor pulley 146, and a control of the temperature of the vapors in the sterilizing chamber, the sterilization of the food may be accurately controlled.

This application is a division of our application Serial No. 233,766, filed June 27, 1951, now abandoned, for Sterilization of Canned Foods.

The preferred form of the invention having been thus described, what is claimed as new is:

1. Apparatus for the controlled sterilization of canned foods comprising, substantially closed separate heating, sterilization and cooling chambers, separate passageways connecting said chambers, continuous conveyor means successively conveying said foods through the heating, sterilization and cooling chambers, means for supplying a controlled mixture of trichloroethylene and perchloroethylene vapors to the sterilization chamber maintaining a substantially uniform preselected temperature in said chamber, an opening between said sterilization and heating chambers intermediate the ends thereof passing the vapor mixture from the sterilization chamber to the heating chamber and filling same, means associated with said opening diverting condensate in said heating chamber away from said opening, water-cooled means in said sterilization chamber outlet and heating chamber inlet passageways maintaining controlled vapor levels therein, and separate means in the heating and sterilization chambers convey condensate away from these chambers.

2. Apparatus as defined in claim 1 wherein the means conveying condensate from the sterilization chamber have outlets spaced longitudinally of the chamber restricting accumulation of condensate within the chamber.

3. Apparatus as defined in claim 1 wherein a drying zone is provided adjacent the heating chamber and the conveyor means passed through said zone before entering the passageway leading to the heating chamber.

4. Apparatus as defined in claim 1 wherein a variable speed drive is provided for the conveyor means carrying canned food through the chambers, a uniform temperature is maintained in the sterilization chamber, and variation in the sterilization time requirements of different foods is compensated for by variation in the speed of the conveyor.

5. Apparatus for controlled continuous sterilization of canned foods comprising a substantially closed canned food heating chamber, a substantially closed sterilization chamber disposed beneath the heating chamber, a cooling chamber disposed above the heating chamber, a drying zone disposed between the cooling chamber and heating chamber, separate passageways connecting the sterilization chamber with the cooling chamber and the heating chamber with the drying zone, a conveyor inlet passageway connecting one end of the heating chamber with the adjacent sterilization chamber, a continuous conveyor carrying canned food through the heating, sterilization and cooling chambers and the drying zone, an opening in the upper face of said sterilization chamber connecting with heating chamber through the floor thereof, a member disposed in spaced overlapping relation to said opening discharging condensate within the heating chamber to the sides of said chamber and away from said opening, a vaporizer providing the vapor mixture to the sterilization chamber at each side of the floor thereof, and temperature controlled condenser means in the heating chamber conveyor inlet passageway and sterilization chamber conveyor outlet passageway maintaining vapor levels in the passageway retaining the vapor in said chambers, and separate means collecting condensate in the sterilization and heating chambers and returning them to the vaporizer.

6. Apparatus as defined in claim 5 wherein a canned food unloading mechanism is located adjacent the outlet end of the cooling chamber for unloading the conveyor and a canned food loading mechanism is located at the end of the drying zone for loading the conveyor prior to entering the heating chamber, and an exhaust fan in the cooling chamber removes vapors from the cooling chamber and drying zone.

7. Apparatus as defined in claim 5 wherein the heating chamber is sealed against flow of vapors therefrom by the condenser in the inlet passageway of the heating chamber and circulation of vapors through the heating and sterilization chambers is provided by condensation of vapor in the heating chamber.

References Cited in the file of this patent
UNITED STATES PATENTS

| | | |
|---|---|---|
| 669,250 | Birkholz | Mar. 5, 1901 |
| 767,961 | Ruff | Aug. 16, 1904 |
| 1,577,219 | Fooks | Mar. 16, 1926 |
| 2,153,577 | Levine | Apr. 11, 1939 |
| 2,214,788 | Dinley | Sept. 17, 1940 |
| 2,243,093 | Flahive | May 27, 1941 |
| 2,273,939 | Dammers | Feb. 24, 1942 |
| 2,361,151 | Reed | Oct. 24, 1944 |
| 2,503,193 | Cessna | Apr. 4, 1950 |
| 2,633,073 | Allan | May 31, 1953 |